United States Patent

Scheiwer

[11] 3,847,181
[45] Nov. 12, 1974

[54] FAUCET
[76] Inventor: Albert T. Scheiwer, 628 Brown Ave., Erie, Pa. 16502
[22] Filed: July 9, 1973
[21] Appl. No.: 377,386

[52] U.S. Cl. .................. 137/613, 4/191, 137/359
[51] Int. Cl. ............................................ E03c 1/00
[58] Field of Search .......................... 251/215–224, 251/284, 88, 330, 318, 319, 321, 322, 323; 137/359, 315; 220/85 P, 40 R; 4/191, 192

[56] References Cited
UNITED STATES PATENTS

| | | | |
|---|---|---|---|
| 1,377,597 | 5/1921 | Mueller | 137/359 X |
| 1,939,363 | 12/1933 | Pearson | 251/88 |
| 2,796,881 | 6/1957 | Scheiwer | 251/215 X |

Primary Examiner—Charles J. Myhre
Assistant Examiner—Ira S. Lazarus

[57] ABSTRACT

A faucet which permits changing washers without requiring special tools or shutting off the main water supply.

7 Claims, 8 Drawing Figures

PATENTED NOV 12 1974
3,847,181
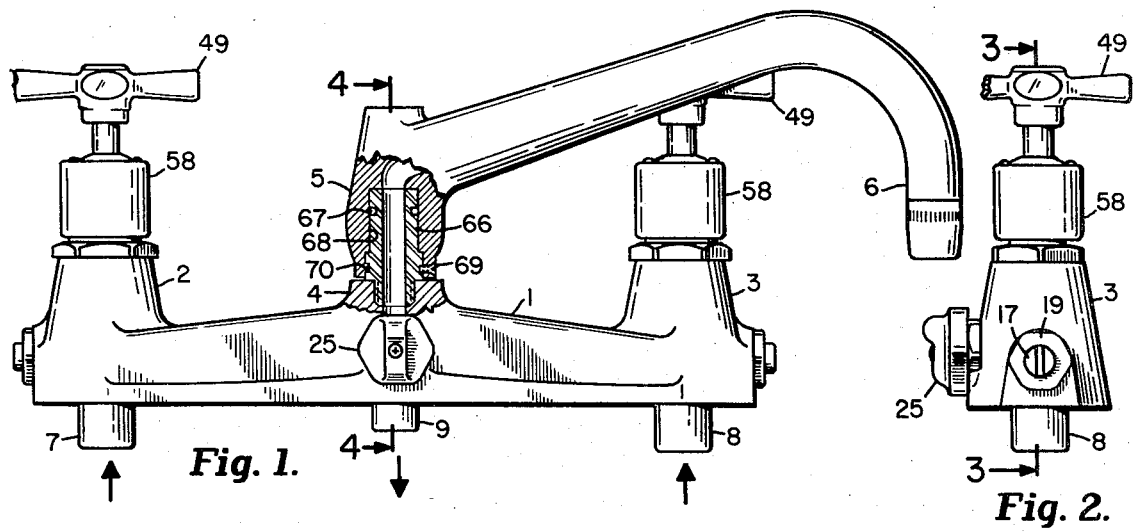
Fig. 1.
Fig. 2.
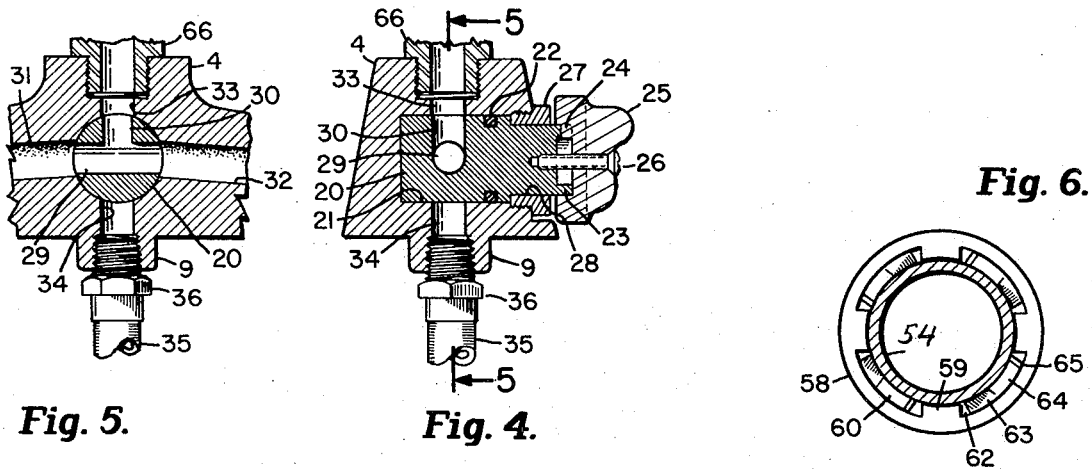
Fig. 5.   Fig. 4.   Fig. 6.
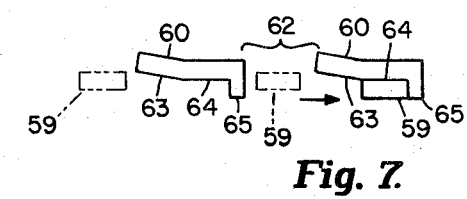
Fig. 7.
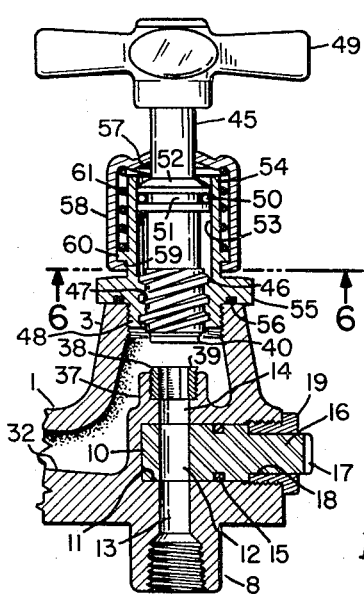
Fig. 3.
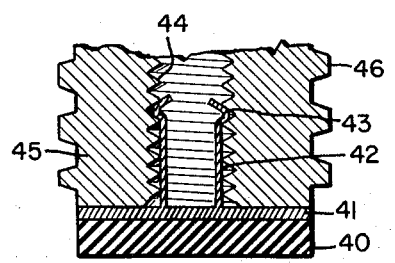
Fig. 8.

FAUCET

This invention is intended to simplify the changing of faucet washers so that this operation can be performed without special tools.

In the drawing,

FIG. 1 is an elevation of a mixing faucet partly broken away,

FIG. 2 is a partial end view of FIG. 1,

FIG. 3 is a section on line 3—3 of FIG. 2,

FIG. 4 is a section on line 4—4 of FIG. 1,

FIG. 5 is a section on line 5—5 of FIG. 4,

FIG. 6 is a section on line 6—6 of FIG. 3 with the faucet bonnet in the released position, FIG. 7 is a diagrammatic view showing the operation of the cam surfaces which hold the plunger assembled in the faucet body, and FIG. 8 is a view of the faucet washer.

The invention is shown applied to a mixing faucet having a body 1 with bosses 2, 3 for hot and cold faucets at opposite ends and a boss 4 for a spout 5 at the center of the body. The spout has one end swiveled on the boss 4 and at the other end has a downwardly directed nozzle 6. The body has a fitting 7 for connection to a hot water line, a fitting 8 for connection to a cold water line and a fitting 9 for connection to a spray hose. The body also has the usual internal coring for conducting water from the faucets to the spout 5. The parts so far described are or may be of common construction.

In each end of the body is a shut-off valve consisting of a cylindrical plug 10 rotatable in a bore 11 closed at its inner end. The plug has a diametral way 12 which in the open position shown in FIG. 3 aligns with an inlet way 13 at the upper end of the fitting 8 and an outlet way 14 leading to the faucet. In the closed position the plug is rotated 90° from the position shown. Leakage from the plug is prevented by an O-ring 15 which makes sealing engagement with the bore 11. The plug has a reduced diameter extension 16 provided with a slot 17 for receiving a coin, screw driver, or other implement for turning the plug. The extension 16 is rotatably received in the bore 18 of a thrust member 19 screwed into the body. The member 19 withstands the water pressure tending to force the plug out of the bore. The shut-off valve is shown in connection with the cold water fitting 8. A plug valve of the same construction is provided for the hot water fitting 7.

At the center of the body is a three-way valve having a cylindrical plug 20 rotatably received in a bore 21 closed at its inner end. The plug 20 has an O-ring 22 making sealing engagement with the bore and a reduced diameter extension 23 slotted to receive a key 24 in a handle 25 fastened to the plug by a screw 26. The plug is held in the body by a thrust member 27 screwed into the body and having a bore 28 through which the extension 23 extends. The plug 20 has a way 29 extending diametrally through the plug and another way 30 at right angles to the way 29 and extending from the center of the plug to one side. As shown in FIG. 5, the plug 20 is in the position to conduct hot water from way 31 in the body 1 and cold water from way 32 through ways 29 and 30 and way 33 to the spout 5. When turned 180° from the position shown in FIG. 5, hot and cold water would be conducted through the ways 29 and 30 to a way 34 leading to the spray hose 35 connected to the fitting 9 by fitting 36.

The hot and cold water faucets in the bosses 2, 3 of the body are of the same construction. Each has an upstanding tubular section 37 with its lower end communicating with the way 14 and its upper end provided with a removable annular seat 38 having an annular edge 39 presented to a faucet washer 40. The washer 40 is carried on a body 41 having resilient tangs 42 with rounded ends 43 which grip the threads of tapped hole 44 in the lower end of faucet plunger 45. In the unstressed position, the rounded portions 43 of the tangs 42 have an outside diameter greater than the tapped hole 44. The friction force developed by compressing the tangs as inserted in the tapped hole 44 is sufficient to hold the faucet washer on the lower end of the plunger.

The plunger has external screw threads 46 screwed into complementary threads 47 in the lower end of a bushing 48. As the plunger is turned by means of handle 49, removably fixed to the upper end of the plunger, the plunger is moved axially toward and away from the seat 38 to open and close the faucet. A seal around the plunger 45 is provided by an O-ring 50 carried in a groove 51 in a collar 52. The O-ring makes sealing engagement with the bore 53 of a tubular projection 54 integral with the bushing 48. The bushing 48 has a wrench surface 55 by which it is screwed into the upper end of the boss 3. A gasket 56 makes sealing engagement with the boss. Once screwed in place, the bushing 48 is effectively part of the body 1.

Movement of the plunger 45 toward the valve seat 38 is limited by engagement of the washer 40 with the valve seat. Movement of the plunger 45 away from the valve seat is limited by engagement of the collar 52 with the top wall 57 of a bonnet 58 slidably mounted on the plunger and depending around and enclosing the projection 54. To releasably mount the bonnet 58 on the bushing 48, the lower end of the bonnet is provided with a plurality of angularly spaced, inwardly extending projections 59 and the projection 54 is provided with a corresponding number of outwardly projecting cam projections 60. A spring 61 arranged between the projections 60 and the top wall 57 of the bonnet urges the bonnet upward. To secure the bonnet to the bushing 48, the bonnet is turned until its projections 59 are received in spaces 62 between the cam projections 60. By exerting a downward pressure on the bonnet, the projections 59 are moved through the spaces 62 and below the projections 60. Then by rotating the bonnet in a clockwise direction looking downward from the top of the bonnet (counter clockwise as viewed in FIG. 6) the projections 59 are forced under cam surfaces 63, pulling the bonnet down against the tension exerted by the spring 61. The cam surfaces 63 terminates in flat surface 64 and stops 65 against which the projections 59 seat when under the flat surfaces 64. There is always an upward force exerted by the spring 61 so that the bonnet 58 has no tendency to work loose in service. The surfaces 64 have a holding or retaining function.

When a faucet washer needs changing, the bonnet 58 is turned in a counterclockwise direction until the projections 59 on the bonnet register with the spaces 62 between the cam projections 60. In this position, the spring 61 lifts the bonnet above the projections 60 and the plunger 45 may now be unscrewed from the boss 48 and lifted out of the faucet.

In changing a faucet washer, the first step is to turn the shut-off valve to the off position. In order to make sure that this is done, it is advisable to first turn the faucet on by the handle 49 and then turn the shut-off valve off. This gives visual proof that the shut-off valve is off. The second step is to turn the bonnet 58 in a counter-clockwise direction until its projections 59 move into the spaces 62 and are lifted above the projections 60 by spring 61. The plunger 45 may then be unscrewed and lifted out of the faucet. The worn faucet washer may be pried loose from the lower end of the plunger and a new washer inserted as shown in FIG. 8. To reassemble the faucet, the plunger is first inserted and partially screwed into the bushing 48. The bonnet 58 is then turned until its projections come opposite the spaces 62. After exerting a downward pressure on the bonnet to overcome the spring 61, the bonnet may then be turned in a clockwise direction to move the projections to the position shown in FIG. 7 and securely fasten the bonnet in place.

The spout 5 is swiveled on a hollow bushing 66 screwed into the boss 4. An O-ring 67 in the bushing makes sealing engagement with a bore 68 in the spout. The spout is retained on the bushing by a screw 69 extending into a groove 70 in the spout. By reason of the three-way valve 20-26 inclusive, water can be directed either through the spout 5 or through the spray hose 35 but not through both. If a spray hose should rupture, the faucet may still be used while waiting for a replacement hose.

What is claimed is:

1. A faucet comprising a hollow body having an inlet and an outlet, an opening within the body through which fluid flows from the inlet to the outlet, a plunger coaxial with the opening and movable axially into and out of said body, having one end within the body for closing and opening said opening by axial movement of the plunger toward and away from said opening, said plunger having the other end extending outside the body, a sleeve projecting from the body having a bore coaxial with the plunger with its inner end open to the inside of the body and its outer end open to the outside of the body, sealing means projecting outwardly from the plunger and slidably engaging said bore for closing said outer end of the sleeve, a bonnet having a top wall extending over said outer end of the sleeve and rotatable and slidable on the plunger and limiting movement of the plunger relative to the bonnet in a direction away from said opening, said bonnet having side walls depending around said sleeve, angularly spaced projections on said sleeve and on the side walls of said bonnet, the projections on the bonnet received in the space between the projections on the sleeve, cam surfaces on said projections interengaging by relative rotation of said bonnet and sleeve for camming the bonnet toward said body and for releasably fastening the bonnet to said body, the top wall of said bonnet limiting the movement of the plunger away from said opening when the bonnet is fastened to the said body so that mere release of the fastening of the bonnet to said body allows said plunger to be moved out of said body, and spring means between said bonnet and sleeve for biasing said bonnet out of the body and holding said surfaces in engagement.

2. The faucet of claim 1 having valve means in said body upstream of said opening and having an operator accessible from the outside of the body for shutting off the flow from the inlet when the plunger is out of the body.

3. The faucet of claim 2 in which the valve means comprises a cylindrical bore in the body between said inlet and said opening, said cylindrical bore having an outer end open to the outside of the body, a closed inner end and two ports on opposite sides of the cylindrical bore leading respectively to the inlet and the outlet, a plug in said cylindrical bore having a diametral way registering with and open to said ports in one position of the plug and closed by said cylindrical bore in another position of the plug, and a sealing ring on the plug between said way and the outer end of the cylindrical bore forming a seal between the plug and the cylindrical bore.

4. The faucet of claim 2 in which the valve means comprises a cylindrical bore in said body and a cylindrical plug with one end rotatable in the bore of the plug accessible from the outside of the body, said plug having a diametral way open in one position of the plug and closed by rotation of the plug from said one position.

5. The faucet of claim 1 in which said body has a cylindrical bore between said inlet and said opening, said cylindrical bore having an outer end open to the outside of the body, a closed inner end and two ports on opposite sides of the cylindrical bore leading respectively to the inlet and the outlet, a plug in said cylindrical bore having a diametral way registering with and open to said ports in one position of the plug and closed by said cylindrical bore in another position of the plug, and a sealing ring on the plug between said way and the outer end of the cylindrical bore forming a seal between the plug and the cylindrical bore.

6. The faucet of claim 1 in which said body has a cylindrical bore between said opening and said outlet, a discharge nozzle and a spray hose downstream of said bore, said bore having an outer end open to the outside of the body, a closed inner end and two ports on opposite sides of the bore leading to said opening, and a third port between said two ports leading to said outlet, a plunger in said bore having ways registering in diverse positions alternatively with said third port and one or the other of said two ports, and an O-ring in the plunger between said ways and the outer end of the bore forming a seal between the plunger and bore.

7. The faucet of claim 1 in which said body has two outlets downstream of said opening, one outlet being a nozzle fitting and the other outlet being a spray hose fitting, and three way valve means for connecting said opening to one or the other outlet.

* * * * *